United States Patent Office.

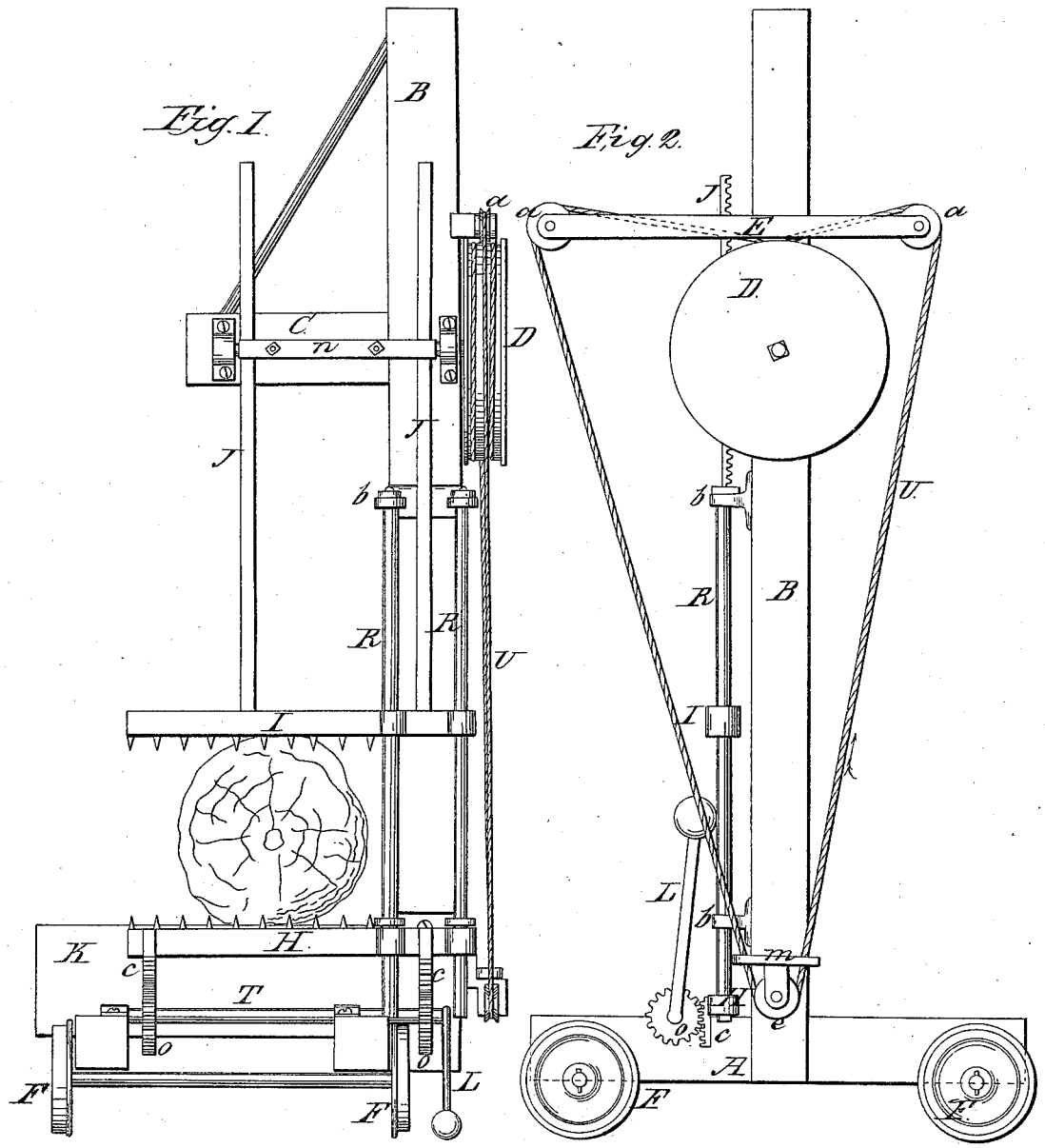

CYRUS G. JONES, OF ORONO, MAINE.

Letters Patent No. 63,799, dated April 16, 1867.

---

IMPROVED SAW-MILL DOG.

---

*The Schedule referred to in these Letters Patent and making part of the same.*

---

TO ALL WHOM IT MAY CONCERN:

Be it known that I, C. G. JONES, of Orono, in the county of Penobscot, in the State of Maine, have invented certain new and useful improvements in Saw-Mill Dogs; and I do hereby declare that the following is a clear, full, and exact description thereof, reference being had to the accompanying drawings, making part of this specification, and to the letters of reference marked thereon.

Figure 1 is a front elevation; and

Figure 2 is a side view of my improved device.

Figure 3 is a view of a part shown in detail.

I construct a frame, A, and mount it on small car-wheels, F, as shown in the drawings. To this frame is secured an upright post, B, having a projecting arm, C, attached near its upper end, as shown in fig. 1. To the front side of the post B two vertical rods, R, are secured, as shown in fig. 1, to serve as guides on which the dogs H and I are arranged to move vertically. These dogs or jaws consist of a strong iron bar, provided with teeth, as shown clearly in fig. 1, and made to embrace the guide-rods R, so as to slide up and down thereon. Across the frame A, just in front of the lower jaw H, is located a shaft, T, having two pinions, O, mounted thereon, and engaging with two vertical rack-bars, c, attached to and projecting downward from the jaw H. A lever, L, having a weight at its outer end, serves to operate the shaft T, and thereby to elevate the jaw H. The upper jaw I is mounted in a similar manner on the guide-rods R, above, and has attached to it two rack-bars, J, which are moved by pinions on the shaft of wheel D, the teeth being on the side next to the post B, and the bars J being held in place by the cross-bar n, as shown in fig. 1. To the side of the post B is secured a cross-piece, E, having a pulley, a, mounted in each end, over which passes a cord, that is wound around the wheel D, said cord passing thence around another pulley, e, secured near the bottom of the post B. To the side of the post B, just above the pulley e, is located a block, m, as shown in fig. 2, having a hole in one end, through which the cord U passes, and in the opposite end of which is cut a V-shaped notch, as represented in fig. 3. The edges of this notch are bevelled on the under side, so as to permit the cord to be moved easily in the direction indicated by the arrow, in which direction it moves when the jaw I descends to fasten on the log. The length of this block m should be such as to push the cord slightly outward at the end where the notch is, by which means the cord is forced into the notch, and while moving easily in the direction indicated, it is clasped by the edges of the notch, and held so as to prevent it from moving easily in the opposite direction, which would permit the jaw to become loosened from the log. By moving the cord U the jaw I may be raised or lowered at pleasure.

In operation, two of these dogs or carriages are used, one in front and the other in rear of the saws, there being tracks arranged for them to run on, and the log being fed forward by two spiked rollers or rag-wheels, located, one in front and another in rear of and close to the saws; these wheels being connected with the mechanism of the mill, by which the required motion is imparted to them. The log being mounted on the car, and resting on the block K, is secured in position by depressing the jaw I, and elevating the jaw H, as shown in fig. 1. The log is so placed on the car as to cause its front end to protrude, so that the saws may enter and cut for some distance before reaching the car. As soon as the log has passed some distance beyond the saws, the dog in rear of the saws is fastened to the log in the same manner, when the one in front is released, and run back to receive another log, which is then brought forward, ready for the saws to enter it, the moment they have passed through the former one. In the mean time the boards are removed from the rear car, and shoved to the edging apparatus, when the rear car is attached to the succeeding log, thus in turn releasing the front car or dog, to receive a fresh log again; and thus by these means an almost continuous succession of logs is kept moving past the saws, producing an almost uninterrupted stream of boards, and greatly expediting the process of making lumber. The ordinary carriage is dispensed with, and there is no necessity for stopping the saws to dog the log or remove the boards. It will of course be understood that the device is specially intended for use in mills operating on a large scale, and in which gang saws are used.

Having thus described my invention, what I claim, is—

1. The short carriage A, constructed substantially as shown and described, for use in front or rear of the saw, and having the two independently moving jaws, H and I, mounted thereon in such a manner as to dog the log from above and below, substantially as herein set forth.

2. The jaw I, mounted on the guide-rods R, and arranged to be operated by the wheel D and cord U, substantially as described.

CYRUS G. JONES.

Witnesses:
 E. P. BUTLER,
 EBEN'R WEBSTER.